(12) United States Patent
Liu

(10) Patent No.: US 11,993,229 B2
(45) Date of Patent: May 28, 2024

(54) BICYCLE CARRIER

(71) Applicant: Che-Lin Liu, Tainan (TW)

(72) Inventor: Che-Lin Liu, Tainan (TW)

( * ) Notice: Subject to any disclaimer, the term of this patent is extended or adjusted under 35 U.S.C. 154(b) by 124 days.

(21) Appl. No.: 17/876,659

(22) Filed: Jul. 29, 2022

(65) Prior Publication Data

US 2024/0034244 A1    Feb. 1, 2024

(51) Int. Cl.
*B60R 9/10* (2006.01)
*B60R 9/045* (2006.01)
*B60R 9/06* (2006.01)

(52) U.S. Cl.
CPC ............... *B60R 9/10* (2013.01); *B60R 9/045* (2013.01); *B60R 9/06* (2013.01)

(58) Field of Classification Search
CPC ........... B60R 9/10; B60R 9/058; B60R 9/045; B60R 9/06
See application file for complete search history.

(56) References Cited

U.S. PATENT DOCUMENTS

| | | | |
|---|---|---|---|
| 6,244,483 B1 * | 6/2001 | McLemore | B60R 9/06 224/521 |
| 6,968,986 B1 * | 11/2005 | Lloyd | B60R 9/06 224/511 |
| 10,618,582 B1 * | 4/2020 | Liu | B62H 3/06 |
| 2005/0056672 A1 * | 3/2005 | Stewart | B60R 9/06 224/504 |
| 2015/0115010 A1 * | 4/2015 | Ziola | B60R 9/10 224/549 |
| 2018/0001830 A1 * | 1/2018 | Olaison | B60R 9/10 |
| 2018/0015885 A1 * | 1/2018 | Flaherty | B60R 9/045 |
| 2019/0161022 A1 * | 5/2019 | McFadden | B60R 9/06 |
| 2020/0406830 A1 * | 12/2020 | Owen | B62H 3/12 |
| 2021/0009223 A1 * | 1/2021 | Tsai | B62H 3/00 |
| 2022/0144183 A1 * | 5/2022 | Peng | B60R 9/10 |
| 2022/0153205 A1 * | 5/2022 | Kuschmeader | B60D 1/60 |
| 2022/0266762 A1 * | 8/2022 | Bowe | B60R 9/10 |

* cited by examiner

*Primary Examiner* — Brian D Nash
(74) *Attorney, Agent, or Firm* — Demian K. Jackson; Jackson IPG PLLC

(57) ABSTRACT

A bicycle carrier contains: a fixing device, a rotation device, a control device, and a holder. The fixing device includes a connection rod and a positioning seat. The positioning seat has a longitudinal receiving orifice and a lateral receiving orifice. The rotation device includes a casing, a grip, and a grasp space. The control device includes an actuation post, a pull lever, a spring, and an insertion portion. The pull lever has a joining portion and an extension. When the extension is pulled by an external force, the insertion portion removes from the longitudinal receiving orifice and the lateral receiving orifice so that the rotation device is forced to rotate between a horizontal fixing position and a horizontal fixing position reciprocately. When the external force to the extension disappears, the rotation device is located on the vertical fixing position, and the insertion portion is received in the vertical receiving orifice.

7 Claims, 10 Drawing Sheets

BICYCLE CARRIER

BACKGROUND OF THE INVENTION

Field of the Invention

The present invention relates to accessory equipment, and more particularly to a bicycle carrier.

Description of the Prior Art

A conventional bicycle carrier is fixed on a vehicle to fix a bicycle. The conventional bicycle carrier is fixed on a roof or a back of the vehicle. When the bicycle carrier is fixed on the roof of the vehicle, it is difficult to fix or detach the bicycle. After carrying the bicycle, a height of the bicycle, the Dicycle carrier and the vehicle is high to cause driving unsafety. When the conventional bicycle carrier is fixed on the back end of the vehicle, the conventional bicycle carrier contains a fixer, a rotation assembly rotatably connected with the fixer, and a holder connected on the rotation assembly to carry the bicycle, wherein the rotation element is rotated and fixed between the vertical fixing position and the horizontal fixing position. When the bicycle carrier is fixed on the horizontal fixing position, the height of the bicycle, the bicycle carrier and the vehicle is decreased to maintain driving safety. When the bicycle carrier is located on the horizontal fixing position, the holder is configured to fix the bicycle.

However, such a conventional bicycle carrier further includes a control element located adjacent to a rotatable connection portion of the rotation assembly and the fixer. But when a user operates the rotation assembly to rotate, the user grips a position away from the rotatable connection position, thus causing troublesome operation. When the control element is arranged on the position away from the connection portion to be operated easily, the control element is rotated with the user's finger to switch the bicycle carrier to a rotating state or a fixing state, thus having inconvenient operation. In addition, the control element is controlled and switched from a rotating movement to a linear movement, thus having complicated is structure, more related components, easy damage, and unsmooth operation.

The present invention has arisen to mitigate and/or obviate the afore-described disadvantages.

SUMMARY OF THE INVENTION

The primary object of the present invention is to provide a bicycle carrier which is capable of simplifying structure, decreasing fabrication cost, and being operated easily.

To provide above-mentioned objects, a Dicycle carrier provided by the present invention contains: a fixing device, a rotation device, a control device, and a holder.

The fixing device induces a connection rod and a positioning seat, and the positioning seat has a longitudinal receiving orifice and a lateral receiving orifice.

The rotation device includes a casing, a grip connected on a front end of the casing. A grasp space is defined between the grip and the casing, and a bottom of the casing is connected with the positioning seat.

The control device includes an actuation post, a pull lever, a spring, and an insertion portion. The actuation post is received in the casing, the pull lever has a joining portion formed on a first end thereof and configured to connect with a top of the actuation post, an extension formed on a second end of the pull lever and located in the grasp space, the spring abuts against the joining portion and the rotation device, and the insertion portion forms on a bottom of the actuation post.

When the extension is pulled by an external force, the insertion portion removes from the longitudinal receiving orifice and the lateral receiving orifice so that the rotation device is forced by the external force to rotate between a horizontal fixing position and a horizontal fixing position reciprocately after the external force to the extension disappears and the rotation device is located on the horizontal fixing position, the insertion portion is received in the lateral receiving orifice, and when the external force to the extension disappears, the rotation device is located on the vertical fixing position, and the insertion portion is received in the vertical receiving orifice.

The holder is fixed on the casing and configured to carry and fix at least one bicycle.

DETAILED DESCRIPTION OF THE PREFERRED EMBODIMENTS

Figure 1:
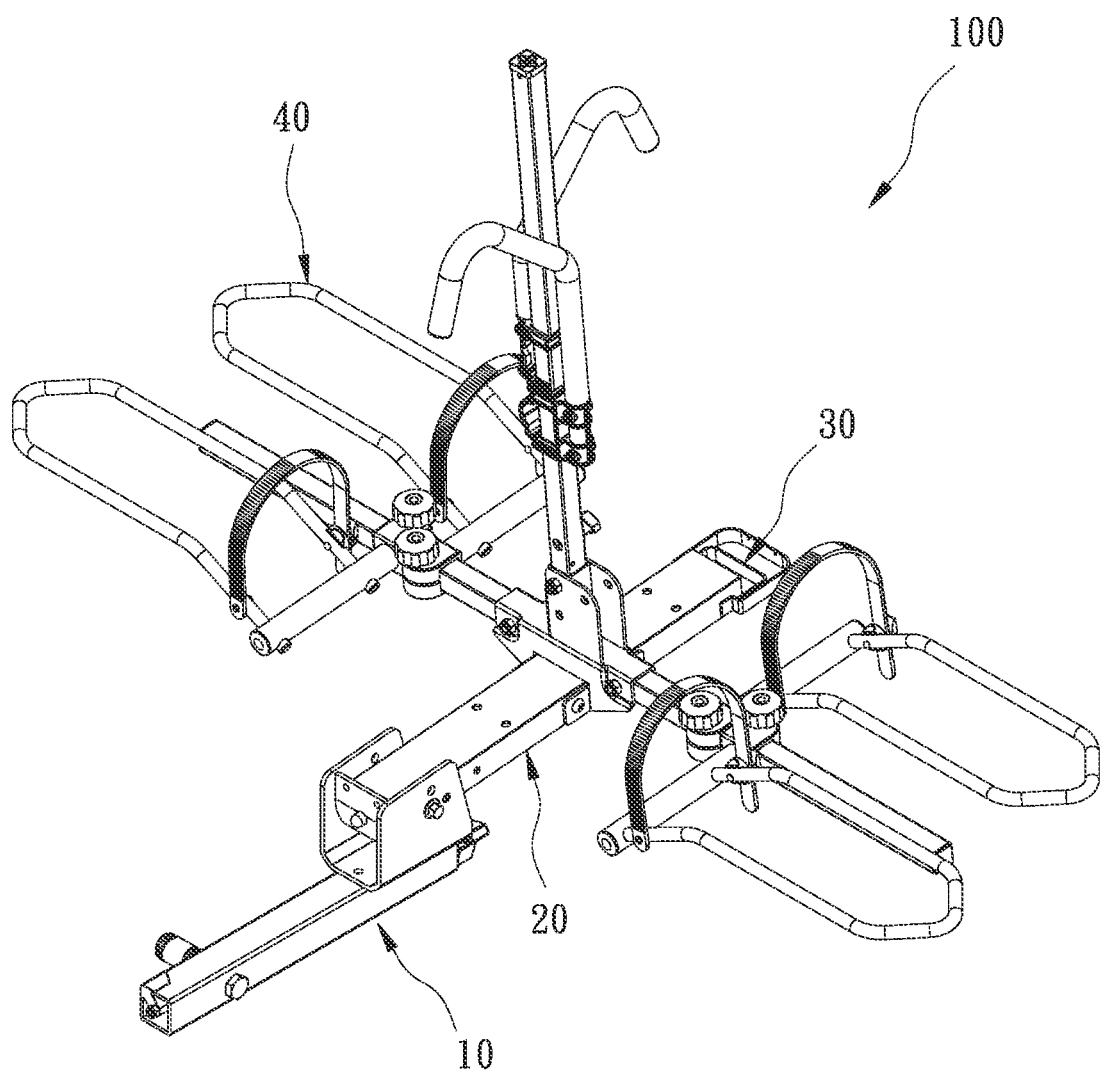
FIG. 1 is a perspective view showing the assembly of a bicycle carrier according to a preferred embodiment of the present invention.
Figure 2:
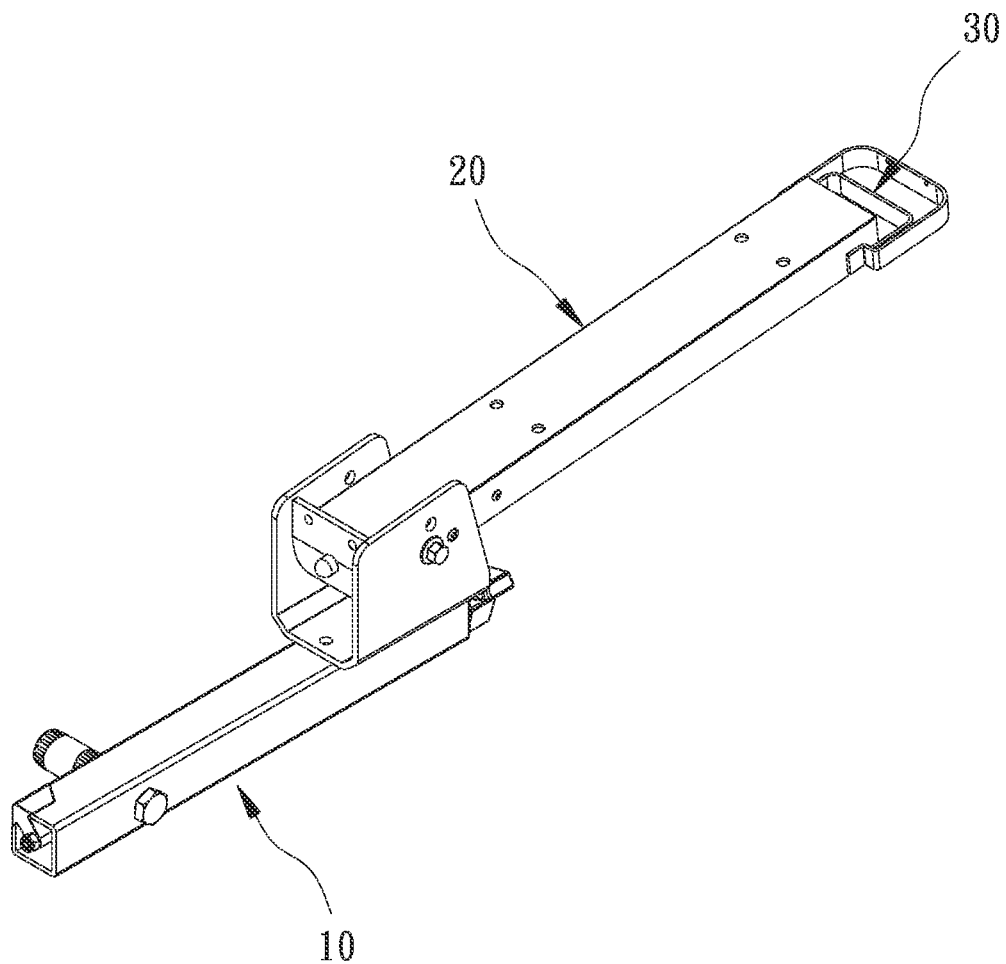
FIG. 2 is a perspective view showing the assembly of a part of the bicycle carrier according to the preferred embodiment of the present invention.
Figure 3:
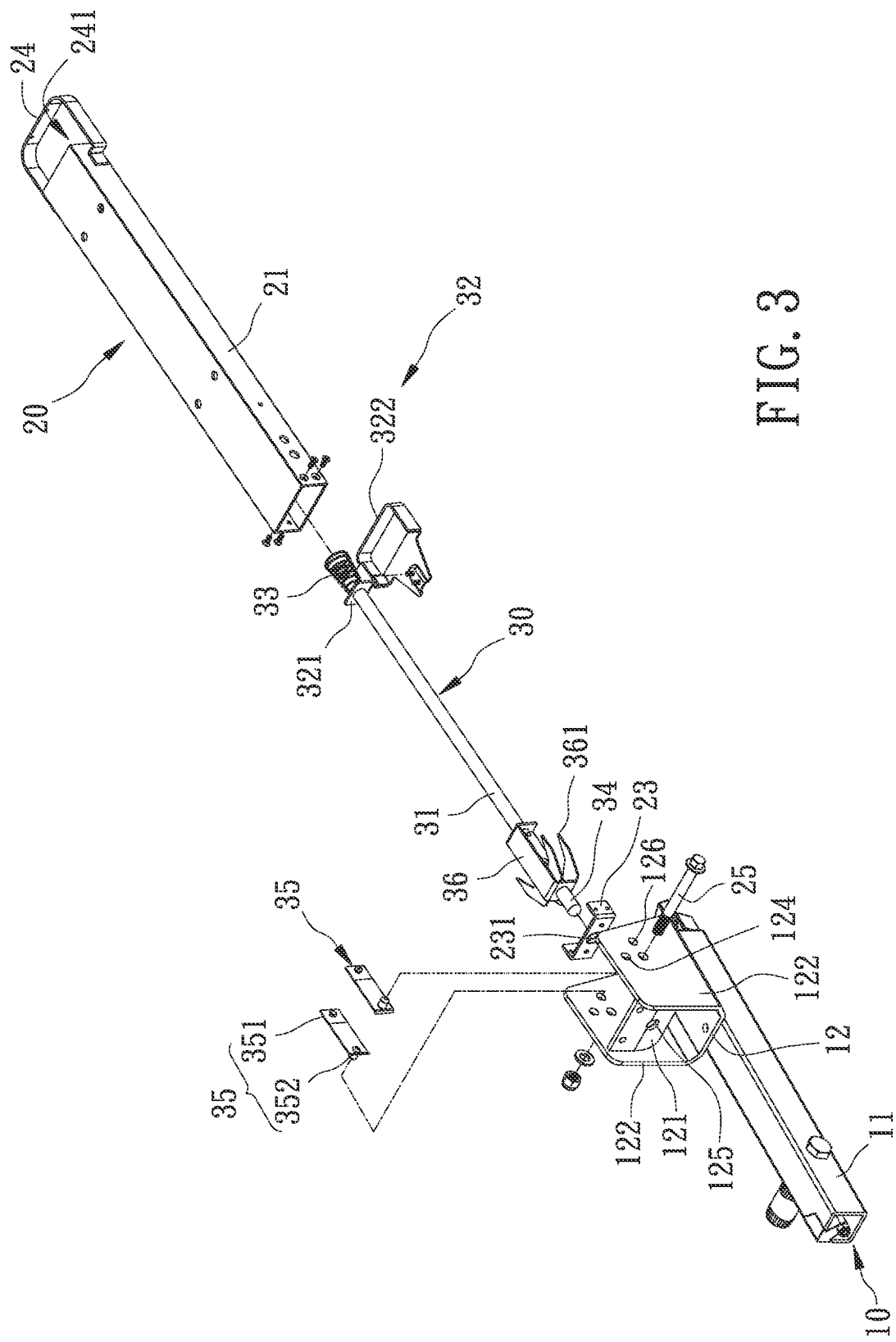
FIG. 3 is a perspective view showing the exploded components of a part of the bicycle carrier according to the preferred embodiment of the present invention.

The present invention will be clearer from the following description when viewed together with the accompanying drawings, which show, for purpose of illustrations only, a preferred embodiment in accordance with the present invention.

With reference to FIGS. 1 to 9, a bicycle carrier 100 according to a preferred embodiment of the present invention comprises: a fixing device 10, a rotation device 20, a control device 30, and a holder 40.

Referring to FIGS. 1-4, the fixing device 10 includes a connection rod 11 and a positioning seat 12. The connection rod 11 is configured to removably connect with a back end of a vehicle, the positioning seat 12 is fixed on the connection rod 11 and has an arcuate bottom fence 121 and two peripheral fences 122, a longitudinal receiving orifice 123 extending vertically on the arcuate bottom fence 121, a lateral receiving orifice 125 extending horizontally on the arcuate bottom fence 121, and a stop shoulder 127 projecting from a bottom of the arcuate bottom fence 121, wherein the two peripheral fences 122 are located on two sides of the arcuate bottom fence 121, and an upper accommodation orifice 124 and a lower accommodation orifice 126 pass through the two peripheral fences 122.

The rotation device 20 includes a casing 21 formed in a flat tube shape, a too cap 22 connected on a front end of the casing 21, a bottom cap 23 connected on a bottom of the casing 21, a grip 24 and a rotary coupling shaft 25 connected on a front end of the casing 21, wherein the top cap 22 has a through orifice 221, the bottom cap 23 has a passing orifice 231 and a grasp space 241 is defined between the grip 24 and the casing 21, wherein the rotary coupling shaft 25 extends through the two peripheral fences 122 of the fixing device 10 and two sides of a bottom of the casing 21 so as to rotatably connect the casing 21 and the fixing device 10, and the rotation device 20 is forced by an external force to rotate on a horizontal fixing position, a vertical fixing position, and a tilted position of the bicycle carrier 100 reciprocately.

The control device 30 includes an actuation post 31, a pull lever 32, a spring 33, an insertion portion 34, two flexible pins 35, and a fastener 36. The actuation post 31 is received in the casing 21 of the rotation device 20, the pull lever 32 has a joining portion 321 formed on a first end thereof and configured to connect with a too of the actuation post 31, an extension 322 formed on a second end of the pull lever 32, extending out of the casing 21 via the through orifice 221 and located in the grasp space 241, such that the pull lever 32 drives the actuation post 31, the spring 33 abuts against the joining portion 321 of the pull lever 32 and the top cap 22 of the rotation device 20, and the actuation post 31 moves to the bottom of the rotation device 20, the insertion portion 34 forms on a bottom of the actuation post 31 to actuate the actuation post 31 and extends out of the passing orifice 231. The two flexible pins 35 are located on two sides of an inner wall of the casing 21, wherein a respective flexible pin 35 has a flexi ale sheet 351 and a bolt 352, wherein a first end of the flexible sheet 351 connects with the inner wall of the casing 21, the bolt 352 is coupled on a second end of the flexible sheet 351, the fastener 36 is connected on the actuation post 31 to be driven with the actuation shaft 31, and the fastener 36 has two hooking portions 361 located on two sides of the actuation 31.

Referring to FIG. 1, the holder 40 is fixed on the casing 21 of the rotation device 20 to support and fix at least one bicycle (not shown). The holder 40 is a well-known prior art, so is further remarks are omitted.

An operation of the bicycle carrier 100 is disclosed as following description.

Figure 4:
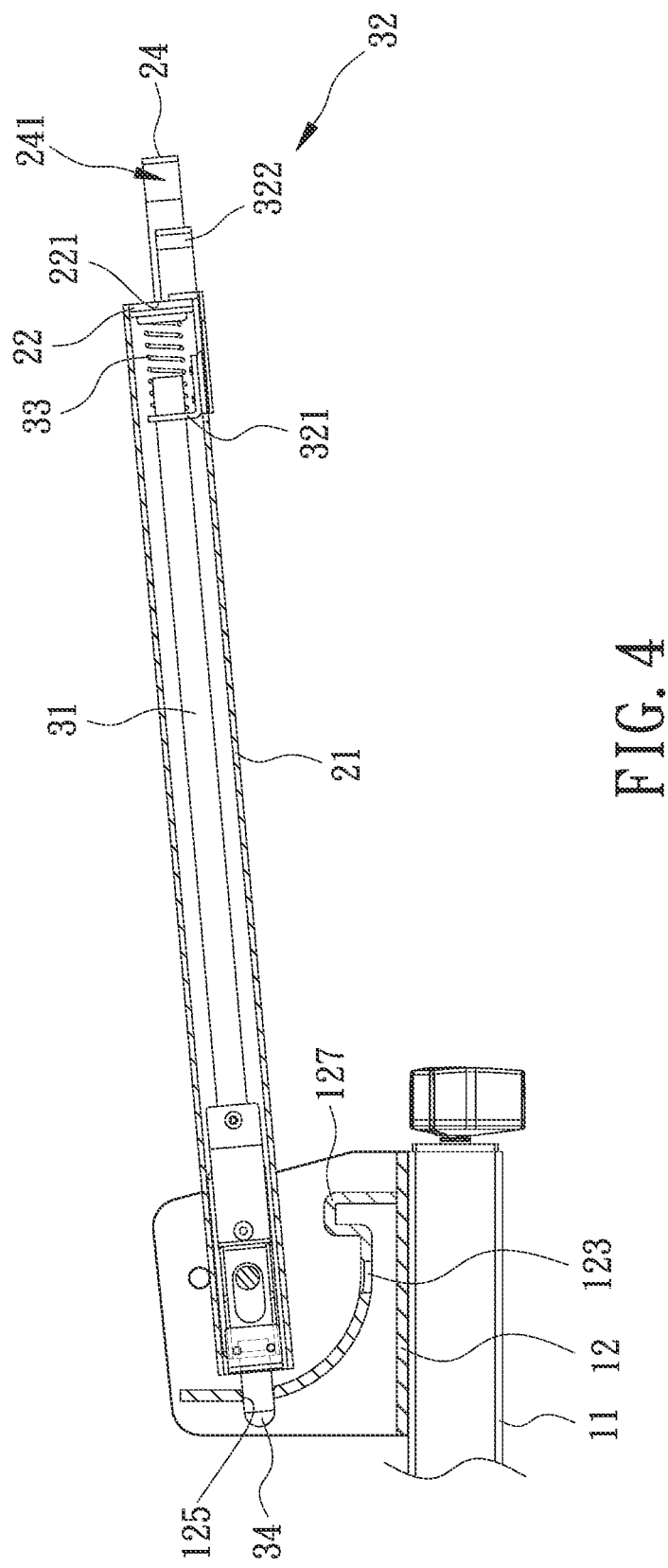
FIG. 4 is a cross sectional view showing the operation of the bicycle carrier according to the preferred embodiment of the present invention.
Figure 8:
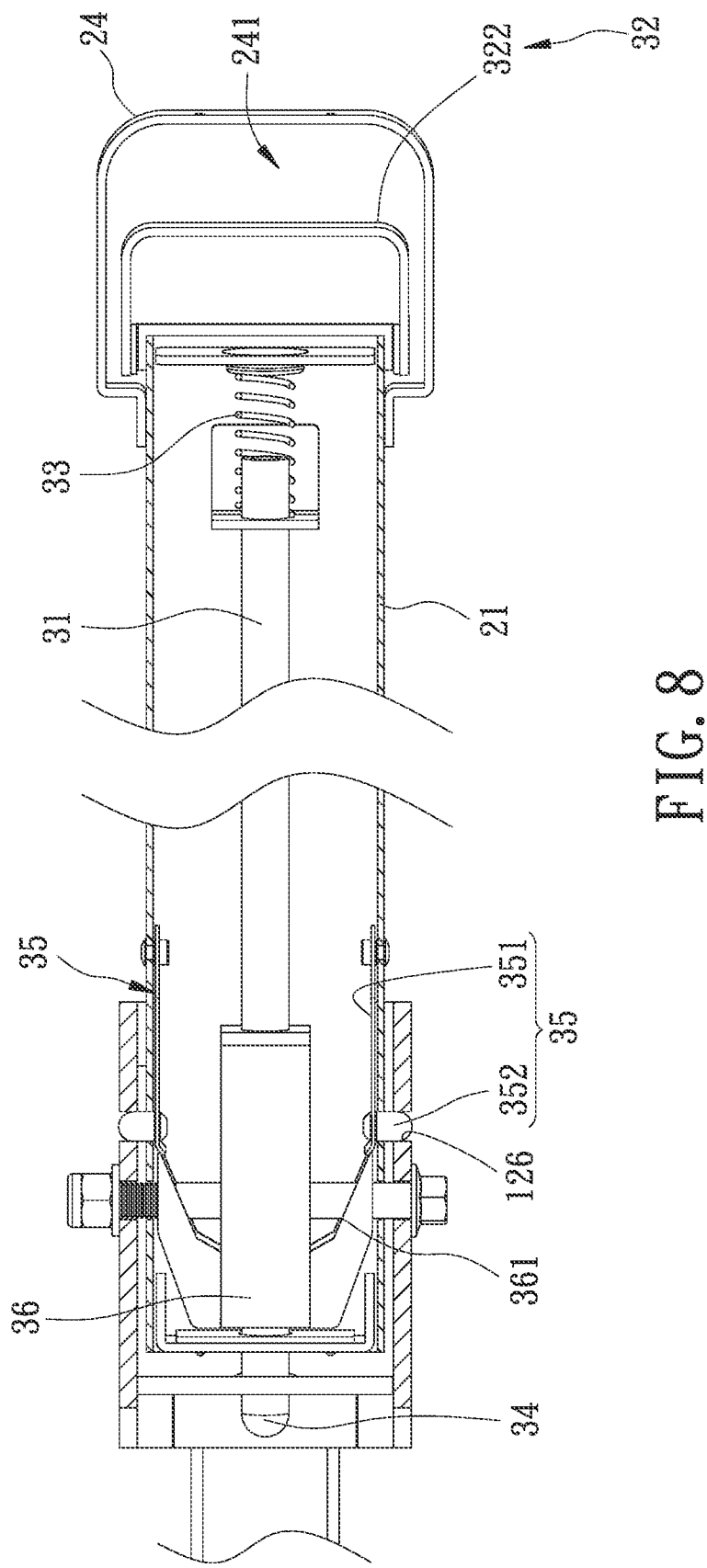
FIG. 8 is another cross sectional view showing the operation of the bicycle carrier according to the preferred embodiment of the present invention.

Referring to FIG. 4, when the rotation device 20 is located on the horizontal fixing position and the control device 30 is not forced by the external force, the actuation shaft 31 of the control device 30 is pushed by the spring 33 to move to the bottom of the rotation device 20 so that the insertion portion 34 is inserted into the lateral receiving orifice 125 of the fixing device 10 via the passing orifice 231, the rotation device 20 is located on the horizontal fixing position. In the meantime, the holder 40 is capable of carrying and fixing the bicycle. Since the control device 30 is not forced by the external force, the bolt 352 of the respective flexible pin 35 is received in the lower accommodation orifice 126 of the rotation device 20 (as shown in FIG. 8) to fix the bicycle more firmly and to avoid a movement of the rotation device 20.

Figure 5:
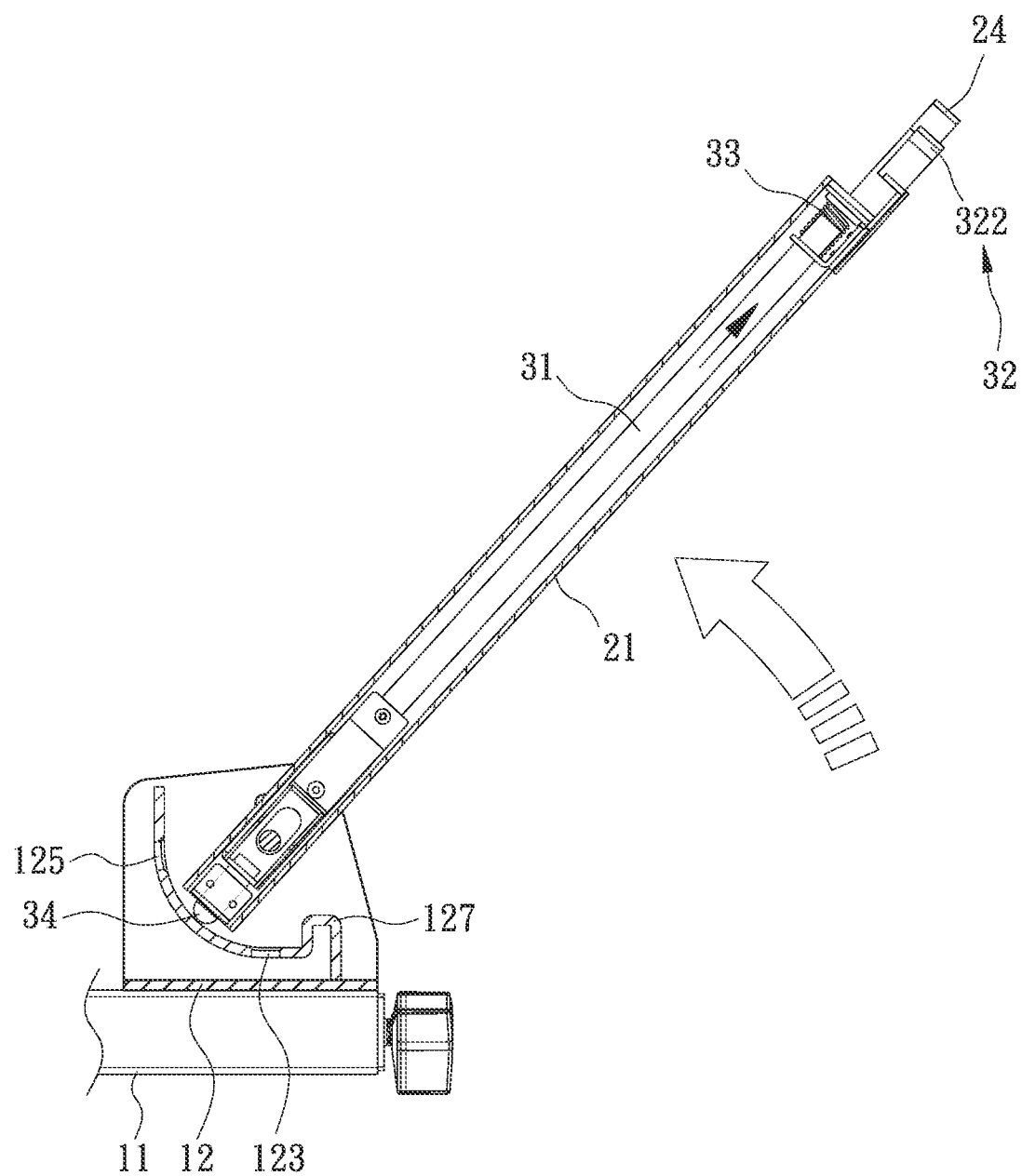
FIG. 5 is another cross sectional view showing the operation of the bicycle carrier according to the preferred embodiment of the present invention.
Figure 6:
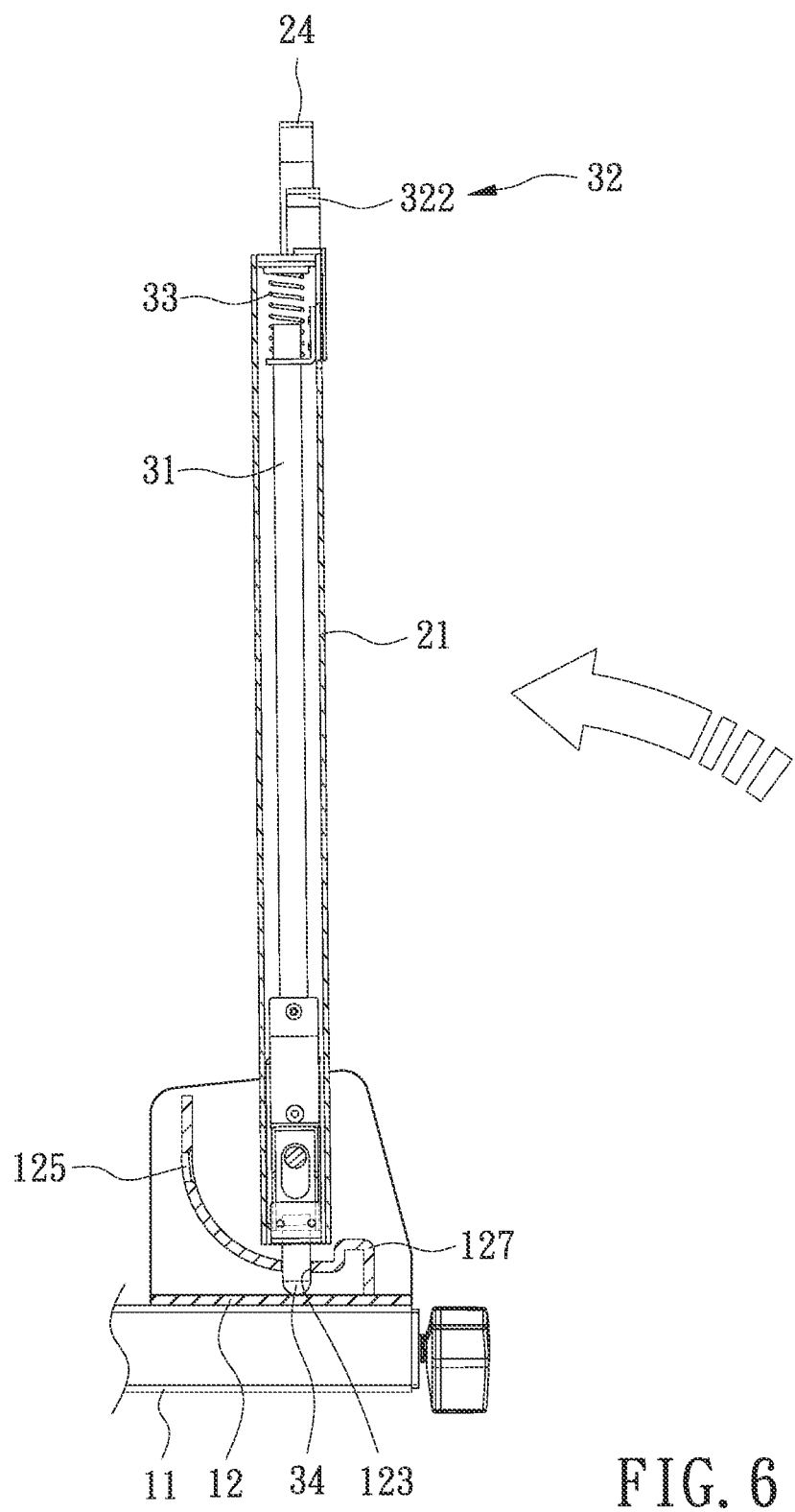
FIG. 6 is also another cross sectional view showing the operation of the bicycle carrier according to the preferred embodiment of the present invention.
Figure 9:
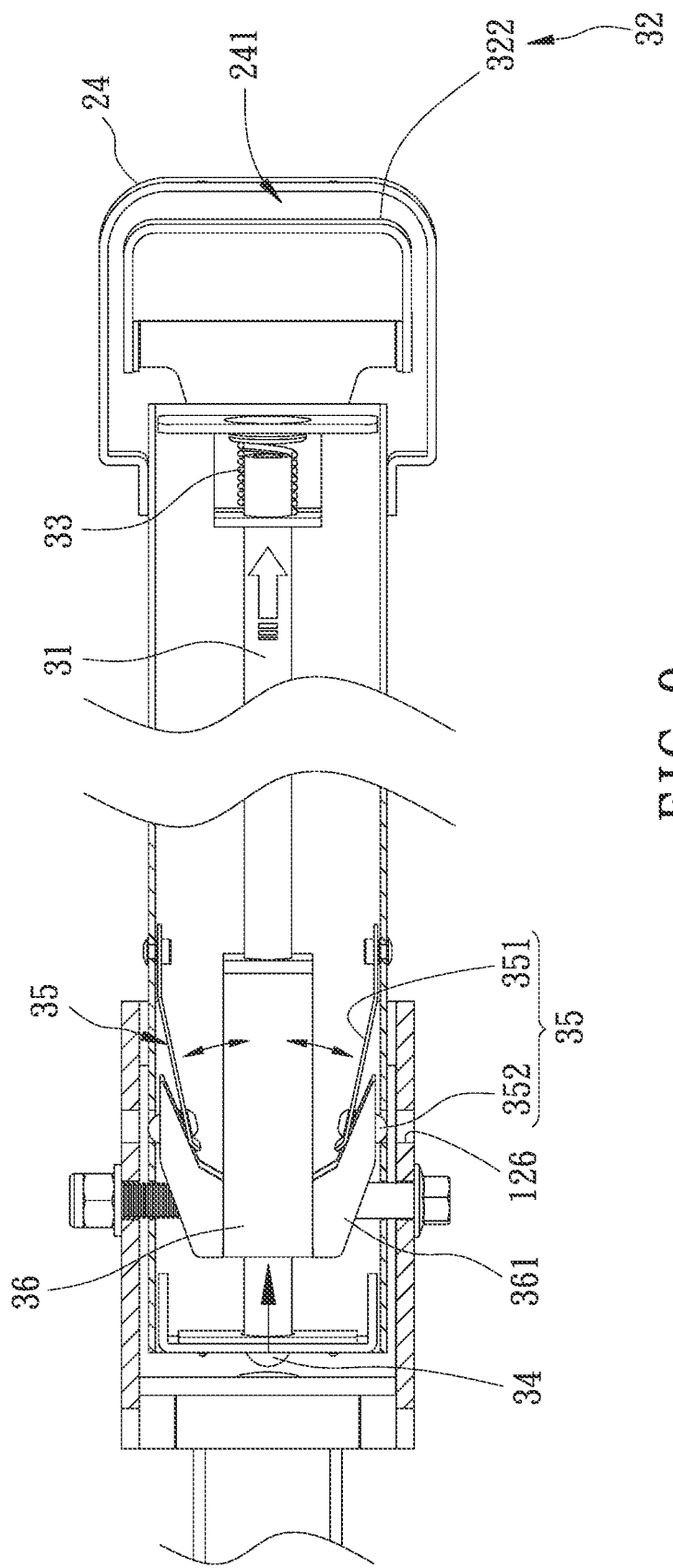
FIG. 9 is also another cross sectional view showing the operation of the bicycle carrier according to the preferred embodiment of the present invention.

When desiring to retract the bicycle carrier, the bicycle is removed from the holder 40. Then, a user's finger inserts into the grasp space 241 and pulls the extension 322 of the pull lever 32 of the control device 30 so that the user's palm grips the extension 322 of the pull lever 32 and the grip 24 of the rotation device 20. Referring further to FIG. 5, the actuation post 31 is driven by the pull lever 32 to move upward and to press the spring 33, such that the insertion portion 34 detaches from the lateral receiving orifice 125, and the fastener 36 is actuated by the actuation post 31 to move, the hooking portion 361 hooks the bolt 352 of the respective flexible pin 35 to remove from the lower accommodation orifice 126 (as illustrated in FIG. 9). Thereafter, the user grips the extension 322 of the pull lever 32 and the grip 24 with one hand to rotate the rotation device 20 upward (as shown in FIG. 5) until the rotation device 20 is located on the vertical fixing position. After the pull lever 32 is released, the external force against the spring 33 disappears, and the spring 33 urges the actuation post 31 to move downward so that the insertion portion 34 is inserted into the longitudinal receiving orifice 123 of the fixing device 10 (as shown in FIG. 6), and the fastener 36 detaches from the respective flexible pin 35 and the respective flexible pin 35 is received in the upper accommodation orifice 124, such that the rotation device 20 is fixed on the vertical fixing position to decrease an extending length and size of the bicycle carrier out of the back end of the vehicle, thus obtaining using safety. When desiring to rotate the bicycle carrier from the vertical fixing position to the horizontal fixing position to fix the bicycle horizontally, the bicycle carrier is rotated downward.

Thereby, the grip 24 of the rotation device 20 and the pull lever 32 of the control device 30 are gripped with the user's one hand so as to switch the bicycle carrier from a fixing state to a rotating state, then the bicycle carrier is rotated upward or downward, thus switching the horizontal fixing position and the vertical fixing position, and the bicycle is fixed after removing the user's hand. Accordingly, the bicycle carrier is operated with the user's one hand, and it is not rotated by the user's finger, thus obtaining easy operation. Furthermore, the bicycle carrier is simplified to reduce fabrication cost, assembly cost, and damage probability. Preferably, the bicycle carrier is operated easily with the user's one hand to be rotates upward and downward, and the fixing positions of the bicycle carrier is adjustable after releasing the pull lever.

Figure 7:
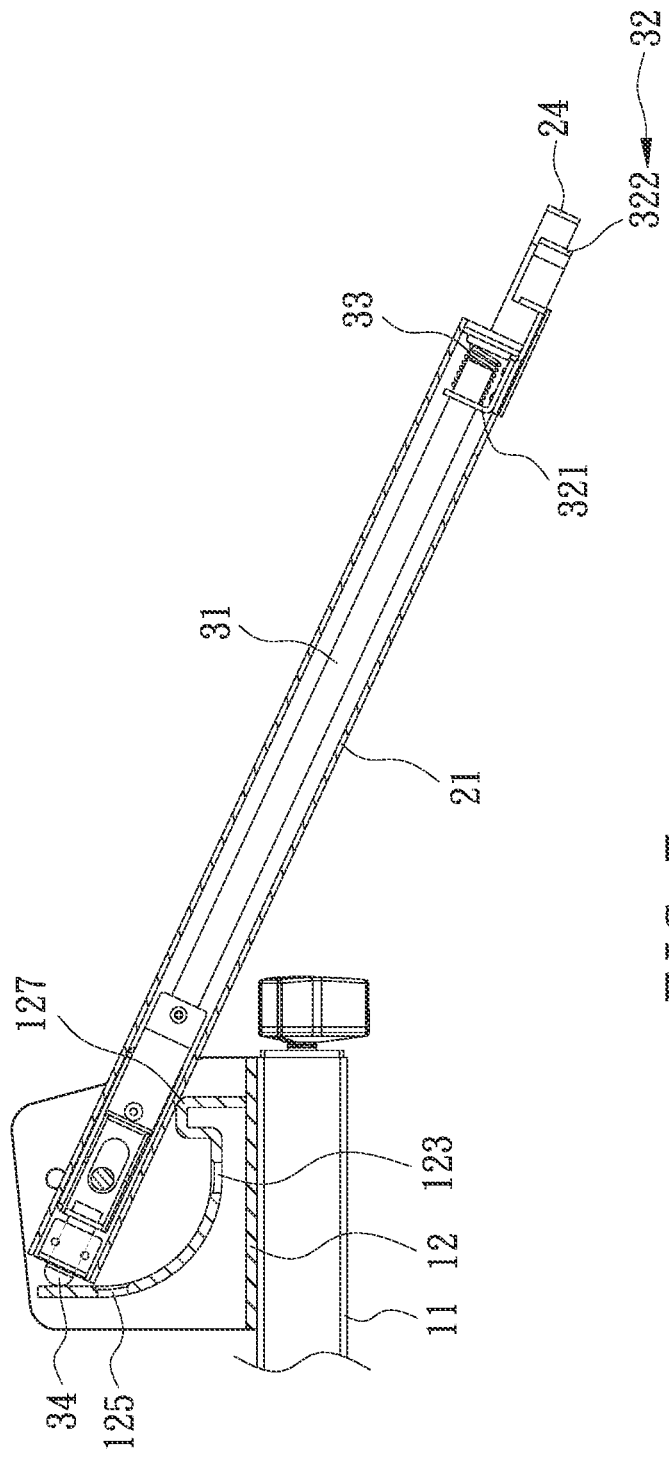
FIG. 7 is still another cross sectional view showing the operation of the bicycle carrier according to the preferred embodiment of the present invention.

As illustrated in FIG. 7, when the rotation device 20 is rotated to the tiled position, the casing 21 is stopped by the stop shoulder 127 to avoid the rotation device 20 contacting a ground, thus enhancing using convenience after opening a door of the vehicle.

Figure 10:
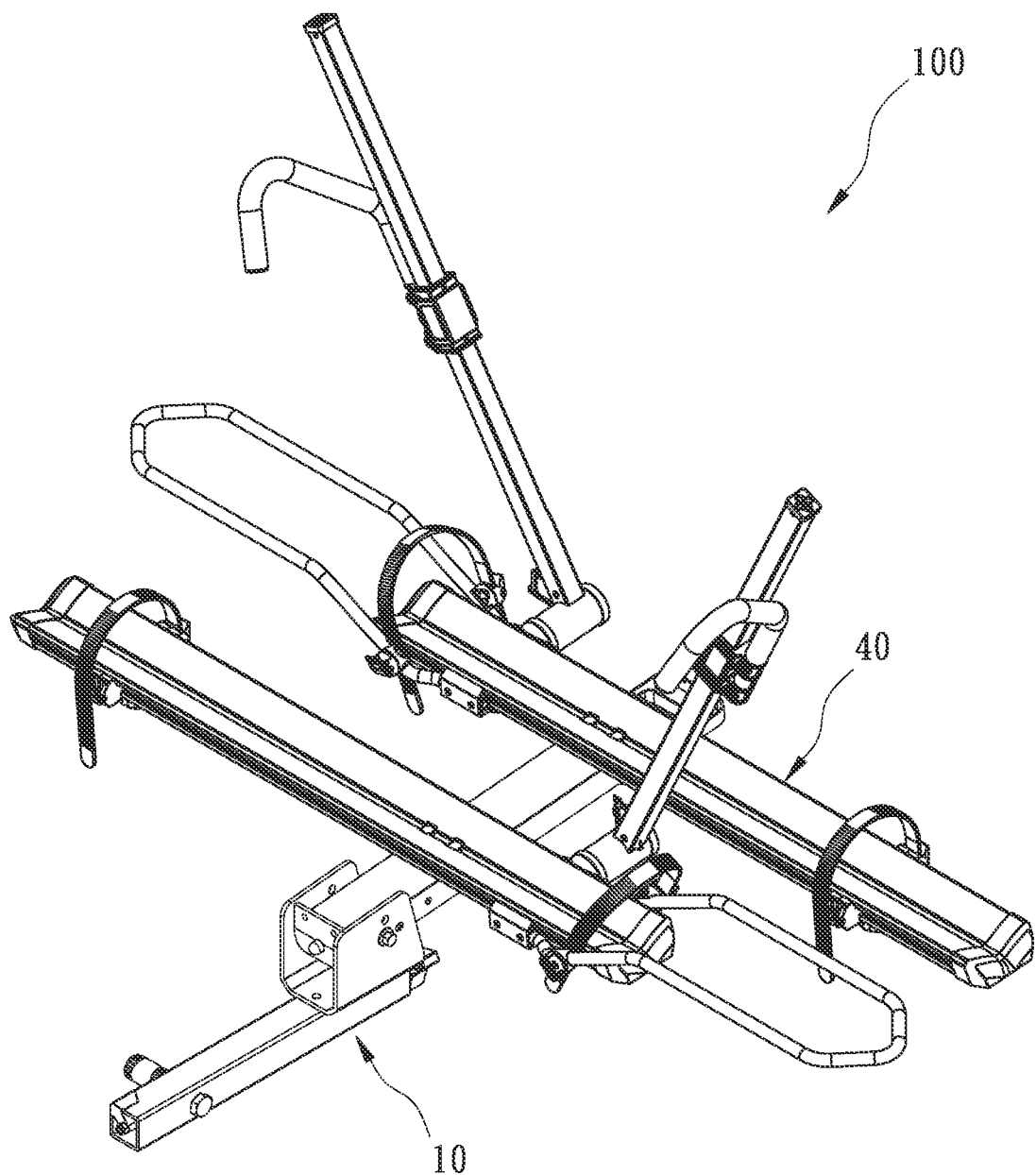
FIG. 10 is a perspective view showing the assembly of a bicycle carrier according to another preferred embodiment of the present invention.

With reference to FIG. 10, the bicycle carrier of the present invention is configured to carry different types of holders 40, thus increasing a using range to obtain market competitiveness.

While various embodiments in accordance with the present invention have been shown and described, it is clear to those spilled in the art that further embodiments may be made without departing from the scope of the present invention.

What is claimed is:

1. A bicycle carrier comprising:

a fixing device including a connection rod and a positioning seat, and the positioning seat having a longitudinal receiving orifice and a lateral receiving orifice;

a rotation device including a casing, a grip connected on a front end of the casing, wherein a grasp space is defined between the grip and the casing, wherein a bottom of the casing is connected with the positioning seat;

a control device including an actuation post, a pull lever, a spring, and an insertion portion, wherein the actuation post is received in the casing, the pull lever has a joining portion formed on a first end thereof and configured to connect with a top of the actuation post, an extension formed on a second end of the pull lever and located in the grasp space, the spring abuts against the joining portion and the rotation device, and the insertion portion forms on a bottom of the actuation post; wherein when the extension is pulled by an external force, the insertion portion removes from the longitudinal receiving orifice and the lateral receiving orifice so that the rotation device is forced by the external force to rotate between a horizontal fixing position and a horizontal fixing position reciprocately, after the external force to the extension disappears and the rotation device is located on the horizontal fixing position, the insertion portion is received in the lateral receiving orifice, and when the external force to the extension disappears, the rotation device is located on the vertical fixing position, and the insertion portion is received in the vertical receiving orifice; and a holder fixed on the casing and configured to carry and fix at least one bicycle.

2. The bicycle carrier as claimed in claim 1, wherein the rotation device is formed in a flat tube shape.

3. The Dicycle carrier as claimed in claim 1, wherein the rotation device further includes a top cap, a bottom cap, and a rotary coupling shaft; the top cap is connected on a front end of the casing, a bottom cap is connected on a bottom of the casing, wherein the top cap has a through orifice configured to receive the extension of the pull lever, wherein the top cap abuts against a first end of the spring, and the bottom cap has a passing orifice configured to receive the insertion portion, wherein the rotary coupling shaft extends through the positioning seat and two sides of a bottom of the casing so as to rotatably connect the casing and the positioning seat.

4. The bicycle carrier as claimed in claim 1, wherein the positioning seat further has an upper accommodation orifice and a lower accommodation orifice; the control device further includes two flexible pins and a fastener, wherein the two flexible pins are located on two sides of an inner wall of the casing, the fastener is connected on the actuation post and has two hooking portions located on two sides of the actuation; when the extension is pulled by the external force, the hooking portion of the fastener pulls the two flexible pins to remove from the upper accommodation orifice and the lower accommodation orifice so that the rotation device is rotated between the horizontal fixing position and the vertical fixing position reciprocately, when the external force to the extension disappears and the rotation device is located on the horizontal fixing position, the hooking portion of the fastener detaches from the two flexible pins so that the two flexible pins insert into the lower accommodation orifice, when the external force to the extension disappears and the rotation device is located on the vertical fixing position, the hooking position of the fastener detaches from the two flexible pins so that the two flexible pins are inserted into the upper accommodation orifice.

5. The bicycle carrier as claimed in claim 4, wherein the positioning seat has an arcuate bottom fence and two peripheral fences, the longitudinal receiving orifice extends vertically on the arcuate bottom fence, the lateral receiving orifice extends horizontally on the arcuate bottom fence, the two peripheral fences are located on two side of the bottom fence, and the upper accommodation orifice and the lower accommodation pass through the two peripheral fences.

6. The bicycle carrier as claimed in claim 4, wherein a respective flexible pin has a flexible sheet and a bolt, a first end of the flexible sheet connects with the inner wall of the casing, the bolt is coupled on a second end of the flexible sheet, and the bolt is inserted into the upper accommodation orifice or the lower accommodation orifice.

7. The Dicycle carrier as claimed in claim 1, wherein the positioning seat has a stop shoulder projecting therefrom; the rotation device is forced by the external force to rotate to a tilted position, wherein when the rotation device is located on the tilted position, the casing abuts against the stop shoulder to avoid the rotation device tilting downward.

\* \* \* \* \*